United States Patent
Mizuno (10) Patent No.: US 10,008,332 B2
(45) Date of Patent: Jun. 26, 2018

(54) MULTILAYER CERAMIC CAPACITOR

(71) Applicant: TAIYO YUDEN CO., LTD., Taito-ku, Tokyo (JP)

(72) Inventor: Kotaro Mizuno, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 29 days.

(21) Appl. No.: 15/362,339

(22) Filed: Nov. 28, 2016

(65) Prior Publication Data

US 2017/0162327 A1    Jun. 8, 2017

(30) Foreign Application Priority Data

Dec. 7, 2015    (JP) .................................. 2015-238557

(51) Int. Cl.

| | |
|---|---|
| *H01G 4/30* | (2006.01) |
| *H01G 4/12* | (2006.01) |
| *H01G 2/06* | (2006.01) |
| *H01G 4/012* | (2006.01) |
| *H01G 4/232* | (2006.01) |

(52) U.S. Cl.
CPC ............... *H01G 4/30* (2013.01); *H01G 2/065* (2013.01); *H01G 4/012* (2013.01); *H01G 4/12* (2013.01); *H01G 4/232* (2013.01)

(58) Field of Classification Search
CPC ............ H01G 4/30; H01G 4/012; H01G 4/12; H01G 4/232; H01G 4/005; H01G 4/008; H01G 4/248; H01G 4/1227
See application file for complete search history.

(56) References Cited

U.S. PATENT DOCUMENTS

| | | |
|---|---|---|
| 4,661,884 A | 4/1987 | Seaman |
| 6,829,134 B2 | 12/2004 | Yamauchi et al. |
| 8,400,753 B2 | 3/2013 | Kim et al. |
| 8,797,709 B2 | 8/2014 | Chung et al. |
| 9,318,265 B2 * | 4/2016 | Kamobe .................. H01G 4/30 |

(Continued)

FOREIGN PATENT DOCUMENTS

JP    2014160693 A    9/2014

OTHER PUBLICATIONS

The specification with the drawings of co-pending U.S. Appl. No. 15/345,269, filed Nov. 7, 2016, by the same applicant.

(Continued)

*Primary Examiner* — Nguyen Ha
(74) *Attorney, Agent, or Firm* — Law Office of Katsuhiro Arai (57) ABSTRACT

In an embodiment, a capacitor body 11 of a multilayer ceramic capacitor 10 has, at a position adjoining a lower height-direction surface f6, a tapered part 11a whose width gradually decreases toward the lower height-direction surface f6 over the entire length of the part. Also, the first external electrode 12 and second external electrode 13 have, at their two ends in the width direction, engagement parts 12a, 13a that wrap around onto the width-direction outer surfaces f3a, f4a of the tapered part 11a, respectively. The multilayer ceramic capacitor, after it has been mounted on a circuit board, can mitigate the phenomenon of the first external electrode and second external electrode separating from the capacitor body without reducing the benefit of capacitance increase.

18 Claims, 4 Drawing Sheets

(56) References Cited

U.S. PATENT DOCUMENTS

| | | | |
|---|---|---|---|
| 2005/0094350 A1* | 5/2005 | Kobayashi | H01G 4/12 |
| | | | 361/306.3 |
| 2005/0264975 A1 | 12/2005 | Yamazaki | |
| 2006/0245141 A1 | 11/2006 | Shirasu et al. | |
| 2014/0174806 A1 | 6/2014 | Park et al. | |
| 2014/0211368 A1* | 7/2014 | Fujii | H01G 4/012 |
| | | | 361/301.4 |
| 2014/0326494 A1 | 11/2014 | Chung et al. | |
| 2015/0016014 A1* | 1/2015 | Park | H01G 2/065 |
| | | | 361/301.4 |
| 2016/0093441 A1* | 3/2016 | Ahn | H01G 4/232 |
| | | | 174/260 |
| 2016/0240317 A1* | 8/2016 | Ro | H01G 4/30 |
| 2016/0351335 A1* | 12/2016 | Kato | H01G 4/30 |
| 2017/0162326 A1 | 6/2017 | Kowase | |
| 2017/0162330 A1 | 6/2017 | Kan | |

OTHER PUBLICATIONS

The specification with the drawings of co-pending U.S. Appl. No. 15/369,675, filed Dec. 5, 2016, by the same applicant.

* cited by examiner

MULTILAYER CERAMIC CAPACITOR

BACKGROUND

Field of the Invention

The present invention relates to a multilayer ceramic capacitor constituted by a capacitor body of roughly rectangular solid shape, which has a first external electrode and a second external electrode provided with a space between them on one of the two height-direction surfaces of the capacitor body in the length direction.

Description of the Related Art

As a way to make a multilayer ceramic capacitor smaller while increasing its capacitance at the same time, a structure is known where a first external electrode and a second external electrode are provided with a space between them on one of the two height-direction surfaces of a capacitor body of roughly rectangular solid shape in the length direction (such as Patent Literature 1 described below). As a supplemental note on this structure, the capacitor body has a built-in capacitive part comprising multiple first internal electrode layers and multiple second internal electrode layers stacked alternately in the width direction with dielectric layers in between. Also, the lead part of each first internal electrode layer is exposed on one of the two height-direction surfaces of the capacitor body, with this exposed part connected independently and electrically to the first external electrode; while the lead part of each second internal electrode layer is exposed on one of the two height-direction surfaces of the capacitor body, with this exposed part connected independently and electrically to the second external electrode.

Because its first external electrode and second external electrode are provided on one of the two height-direction surfaces of the capacitor body, this multilayer ceramic capacitor can prevent, to the maximum extent possible, the external dimensions of the capacitor body from being limited by the first external electrode and second external electrode, compared to when the external electrodes have an L-shape, horizontal U-shape, quadrangular cylinder shape with bottom, or the like. This means that, even when the external dimensions of the multilayer ceramic capacitor are small, the capacitor body can be designed with the maximum possible external dimensions, which in turn allows the contour dimensions of the first internal electrode layer and second internal electrode layer to increase, respectively, thereby increasing the facing area of the internal electrode layers and achieving a larger capacitance as a result.

However, the present inventors realized the following problems. That is, a multilayer ceramic capacitor with its first external electrode and second external electrode provided on one of the two height-direction surfaces of the capacitor body generally exhibits weaker separation strength with respect to the first external electrode, and also to the second external electrode, compared to when the external electrodes have an L-shape, horizontal U-shape, quadrangular cylinder shape with bottom, or the like.

To be specific, the surfaces of the first external electrode and second external electrode contacting one of the two height-direction surfaces of the capacitor body each have a planar shape, so when a force acts upon these contact surfaces after the multilayer ceramic capacitor has been mounted on a circuit board, there are concerns that the first external electrode and second external electrode may each displace relative to the capacitor body and end up separating from the capacitor body. Particularly when the multilayer ceramic capacitor is made smaller, an extra factor of having to ensure a space between the first external electrode and second external electrode to prevent short-circuiting adds to the difficulty of allowing the first external electrode and second external electrode to contact one of the two height-direction surfaces of the capacitor body over a wide area, and this makes the aforementioned separation phenomenon more apparent.

Any discussion of problems and solutions involved in the related art (particularly those discussed above) has been included in this disclosure solely for the purposes of providing a context for the present invention, and should not be taken as an admission that any or all of the discussion were known at the time the invention was made.

BACKGROUND ART LITERATURES

[Patent Literature 1] Japanese Patent Laid-open No. 2014-160693

SUMMARY

An object of the present invention is to provide a multilayer ceramic capacitor that, after it has been mounted on a circuit board, can mitigate the phenomenon of the first external electrode and second external electrode separating from the capacitor body without reducing the benefit of capacitance increase.

To achieve the aforementioned object, the multilayer ceramic capacitor pertaining to the present invention is a multilayer ceramic capacitor constituted by a capacitor body of roughly rectangular solid shape, which has a first external electrode and a second external electrode provided with a space between them on one of the two height-direction surfaces of the capacitor body in the length direction, wherein: the capacitor body has a built-in capacitive part comprising multiple first internal electrode layers and multiple second internal electrode layers stacked alternately in the width direction with dielectric layers in between; the lead part of each of the multiple first internal electrode layers is exposed on one of the two height-direction surfaces, with this exposed part connected independently and electrically to the first external electrode; the lead part of each of the multiple second internal electrode layers is exposed on one of the two height-direction surfaces, with this exposed part connected independently and electrically to the second external electrode; the capacitor body has, at a position adjoining one of the two height-direction surfaces, a tapered part whose width gradually decreases toward one of the two height-direction surfaces over the whole part in the length direction; and the first external electrode and second external electrode have engagement parts at their two ends in the width direction, each wrapping around onto the width-direction outer surface of the tapered part.

According to the present invention, a multilayer ceramic capacitor can be provided that, after it has been mounted on a circuit board, can mitigate the phenomenon of the first external electrode and second external electrode separating from the capacitor body without reducing the benefit of capacitance increase.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

10—Multilayer ceramic capacitor, 11—Capacitor body, f1—One length-direction surface of the capacitor body, f2—Other length-direction surface of the capacitor body, f3—One width-direction surface of the capacitor body, f4—Other width-direction surface of the capacitor body, f5—One height-direction surface of the capacitor body, f6—Other height-direction surface of the capacitor body, 11a—Tapered part of the capacitor body, f3a, f4a—Width-direction outer surface of the tapered part, 11b—Concaved part of the tapered part, 12—First external electrode, 12a—Engagement part of the first external electrode, 13—Second external electrode, 13a—Engagement part of the second external electrode, 14—First internal electrode layer, 14a—Lead part of the first internal electrode layer, 15—Second internal electrode layer, 15a—Lead part of the second internal electrode layer.

DETAILED DESCRIPTION OF EMBODIMENTS

First, the structure of a multilayer ceramic capacitor 10 to which the present invention is applied, is explained using FIGS. 1 through 6. It should be noted that, while in FIG. 4A and FIG. 4B there are 12 each of the first internal electrode layers 14 and second internal electrode layers 15 described below, this is only for the purpose of illustration and does not limit the number of the first internal electrode layers 14 or that of the second internal electrode layers 15. In other words, the number of the first internal electrode layers 14 and that of the second internal electrode layers 15 may be 13 or more, or 11 or less.

Figure 1:
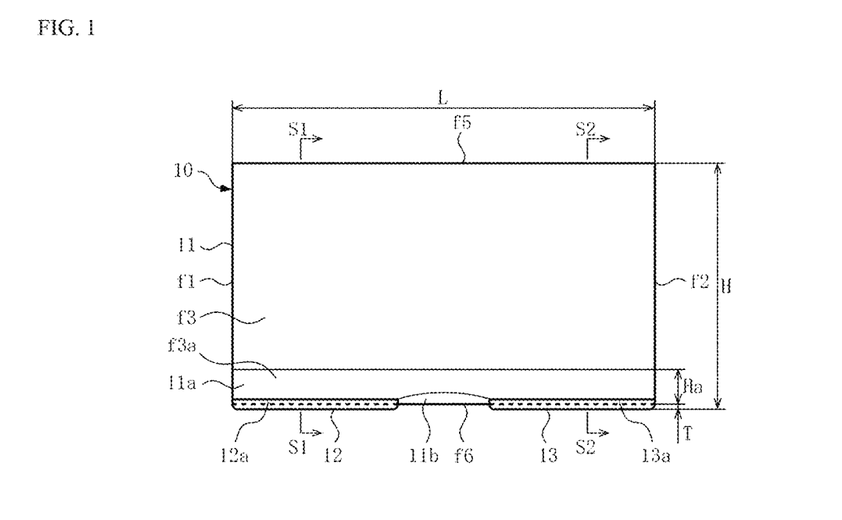
FIG. 1 shows a multilayer ceramic capacitor to which the present invention is applied, as viewed from one side of it in the width direction according to an embodiment.
Figure 2A:
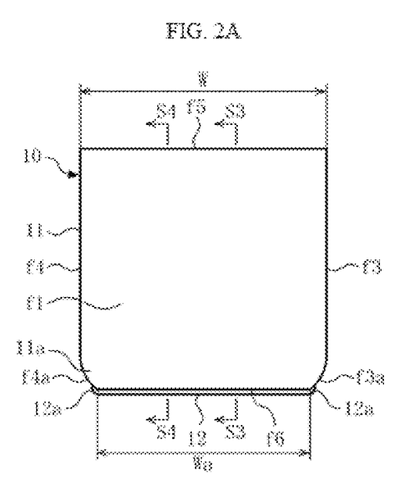
FIG. 2A shows the multilayer ceramic capacitor in FIG. 1 as viewed from one side of it in the length direction.
Figure 2B:
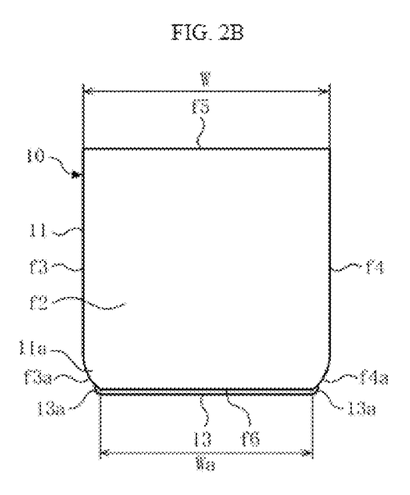
FIG. 2B shows the multilayer ceramic capacitor in FIG. 1 as viewed from the other side of it in the length direction according to an embodiment.
Figure 3:
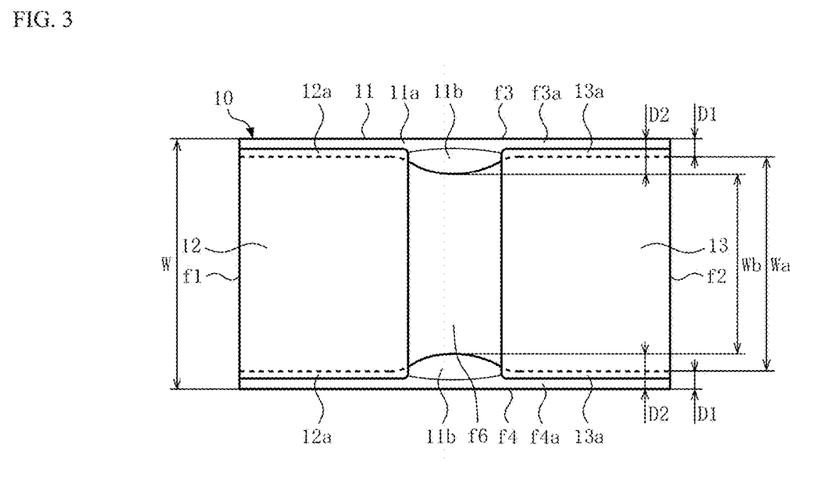
FIG. 3 shows the multilayer ceramic capacitor in FIG. 1 as viewed from the other side of it in the height direction according to an embodiment.

As shown in FIGS. 1 through 3, the multilayer ceramic capacitor 10 has a capacitor body 11 of roughly rectangular solid shape, as well as a first external electrode 12 and a second external electrode 13 provided on one of the two height-direction surfaces (the other height-direction surface f6 is described below) of the capacitor body 11, and its external dimensions are specified by length L, width W (the width of the one height-direction surface f5 is described below) and height H. It should be noted that, while the multilayer ceramic capacitor 10 shown in FIGS. 1 through 3 (and also in FIGS. 4 through 6) is drawn based on a prototype whose length L is 1200 µm, width W is 700 µm and height H is 700 µm (all are reference dimensions in design that do not include tolerance), the values of length L, width W, and height H are not limited in any way so long as "Length L>Width W=Height H" is satisfied. In addition, while the multilayer ceramic capacitor 10 shown in FIGS. 1 through 3 (and also in FIGS. 4 through 6) has external dimensions that satisfy "Length L>Width W=Height H," its external dimensions may be those that satisfy "Length L>Width W>Height H" or "Length L>Height H>Width W."

As shown in FIGS. 1 through 3, the capacitor body 11 has one length-direction surface f1 and the other length-direction surface f2 that are roughly parallel to each other, one width-direction surface f3 and the other width-direction surface f4 that are roughly parallel to each other, and one height-direction surface f5 and the other height-direction surface f6 that are roughly parallel to each other. Also, at a position adjoining the other height-direction surface f6 of the capacitor body 11, a tapered part 11a is provided whose width gradually decreases toward the other height-direction surface f6 over the entire part in the length direction. Additionally, one width-direction outer surface f3a of the tapered part 11a continues steplessly to the one width-direction surface f3 and is constituted by an outwardly bulging curved surface, while the other width-direction outer surface f4a of the tapered part 11a continues steplessly to the other width-direction surface f4 and is constituted by an outwardly bulging curved surface. Furthermore, the tapered part 11a has, at the length-direction center of the width-direction outer surface f3a and also at the length-direction center of the width-direction outer surface f4a, a concaved part 11b that extends from midway through the width-direction outer surface f3a or f4a in the height direction to the other height-direction surface f6, where each concaved part 11b continues steplessly to the width-direction outer surface f3a or f4a and is constituted by an inwardly concaving curved surface. It should be noted that the width-direction outer surfaces f3a, f4a of the tapered part 11a, although they can be planar surfaces, are preferably curved surfaces that bulge outward. Also, the symbol Ha in FIG. 1 represents the height-direction dimension of the tapered part 11a with reference to the other height-direction surface f6 of the capacitor body 11. Additionally, the symbol T in FIG. 1 represents the thickness of the first external electrode 12 and that of the second external electrode 13 with reference to the other height-direction surface f6 of the capacitor body 11.

Figure 6:
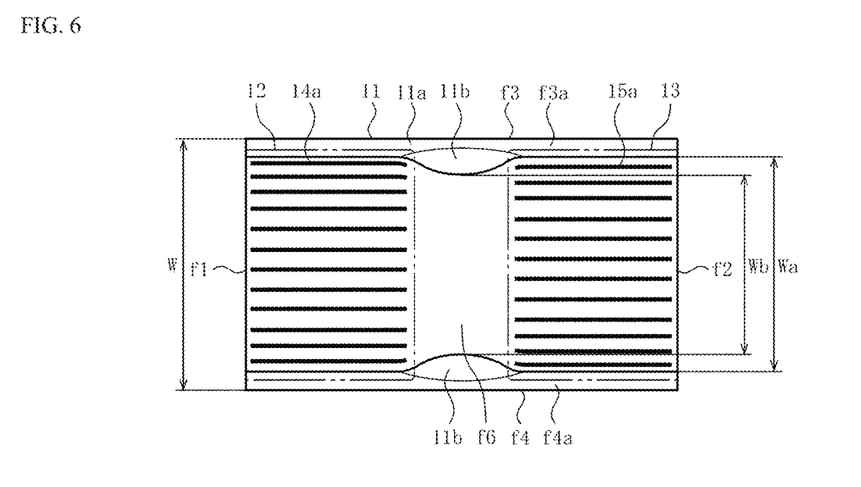
FIG. 6 is the same as FIG. 3, except that the first external electrode and second external electrode have been removed according to an embodiment.

In other words, the other height-direction surface f6 of the capacitor body 11 has an hourglass shape with a constricted center in the length direction because of the existence of the concaved parts 11b on both sides in the width direction, as shown in FIGS. 3 and 6. This means that the part of the other height-direction surface f6 adjoining the one length-direction surface f1, and the part of it adjoining the other length-direction surface f2, have a width Wa which is smaller than the width W of the one height-direction surface f5, and that the minimum width of the length-direction center part of the other height-direction surface f6, or width Wb, is smaller than the width Wa.

Also, the edges along both of the width-direction sides of the length-direction center part of the other height-direction surface f6 continue steplessly, respectively, to the edges along both of the width-direction sides of the two parts of width Wa that are present on both sides in the length direction, and are constituted by inwardly concaving curved lines. It should be noted that the symbol D1 in FIG. 3 represents the width-direction dimension from the one width-direction surface f3 or other width-direction surface f4 of the capacitor body 11 to the part of the other height-direction surface f6 corresponding to the width Wa, or specifically (W−Wa)/2. Also, the symbol D2 in FIG. 3 represents the width-direction dimension from the one width-direction surface f3 or other width-direction surface f4 of the capacitor body 11 to the location of the other height-direction surface f6 corresponding to the width Wb, or specifically (W−Wb)/2.

Figure 4A:
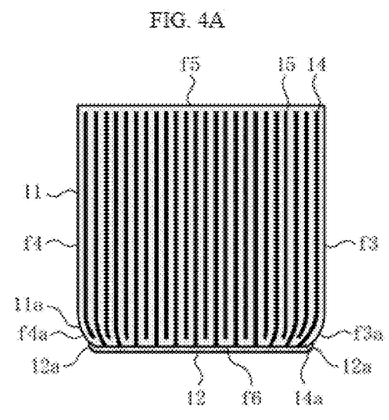
FIG. 4A is a cross sectional view of FIG. 1 along line S1-S1.
Figure 4B:
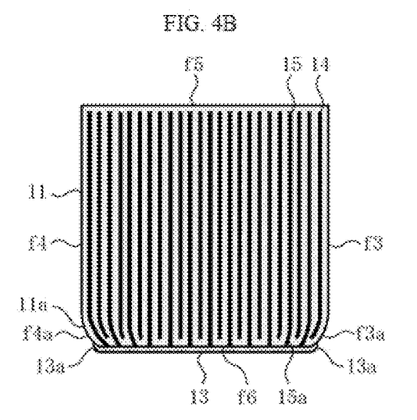
FIG. 4B is a cross sectional view of FIG. 1 along line S2-S2.
Figure 4C:
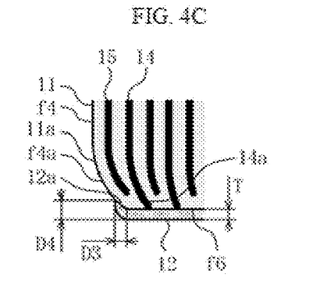
FIG. 4C is a partially enlarged view of FIG. 4A according to an embodiment.
Figure 5A:
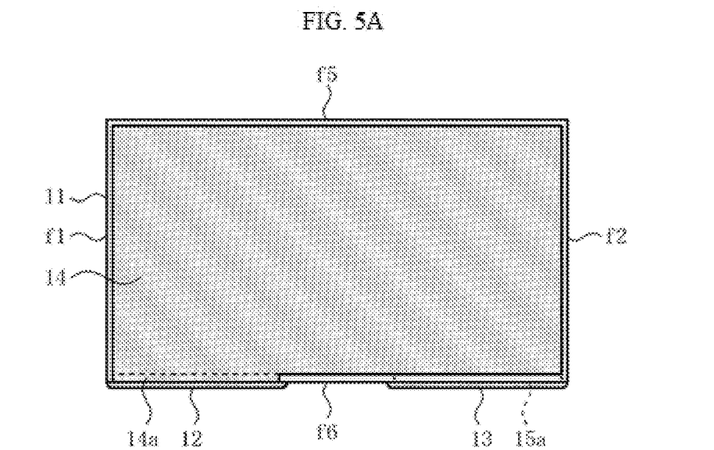
FIG. 5A is a cross sectional view of FIG. 2A along line S3-S3.
Figure 5B:
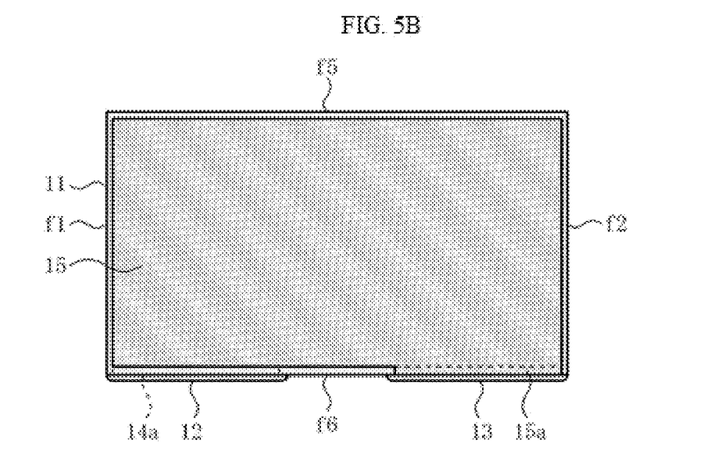
FIG. 5B is a cross sectional view of FIG. 2A along line S4-S4 according to an embodiment.

As shown in FIGS. 4 through 6, the capacitor body 11 has a built-in capacitive part (no symbol) comprising multiple first internal electrode layers 14 and multiple second internal electrode layers 15 stacked alternately in the width direction with a dielectric layer (no symbol) in between. Each first internal electrode layer 14 and each second internal electrode layer 15 have a rectangular shape of roughly equal contour dimensions, and the two length-direction sides, two width-direction sides and two height-direction sides (except where the lead parts 14a, 15b described below are present) of the capacitive part are covered with margin parts (no symbol) constituted by dielectric material. Also, each first internal electrode layer 14 integrally has a lead part 14a of rectangular shape on its side proximal to the other height-direction surface f6 at a position close to the one length-direction surface f1, where the edge of each lead part 14a is exposed on the other height-direction surface f6 near the one length-direction surface f1 where the width is Wa. Furthermore, each second internal electrode layer 15 integrally has a lead part 15a of rectangular shape whose contour dimensions are roughly equal to that of the lead part 14a, on its side proximal to the other height-direction surface f6 at a position close to the other length-direction surface f2, where the edge of each lead part 15a is exposed on the other height-direction surface f6 near the other length-direction surface f2 where the width is Wa.

As shown in FIGS. 4A, 4B, and 4C, among the first internal electrode layers 14, several first internal electrode layers 14 close to the width-direction outer surfaces f3a, f4a of the tapered part 11a are inwardly curved in such a way that their part (including the lead part 14a) close to the other height-direction surface f6 corresponds to the shape of the width-direction outer surface f3a or f4a. Also, among the second internal electrode layers 15, several second internal electrode layers 15 close to the width-direction outer surfaces f3a, f4a of the tapered part 11a are inwardly curved in such a way that their part (including the lead part 15a) close to the other height-direction surface f6 corresponds to the shape of the width-direction outer surface f3a or f4a. More specifically, respective parts (including the lead parts 14a and 15a, respectively) of the first internal electrode layer 14 and second internal electrode layer 15 closest to the width-direction outer surfaces f3a, f4a are inwardly curved, where close to the other height-direction surface f6, in the same manner as with the shapes of the width-direction outer surfaces f3a, f4a, while respective parts (including the lead parts 14a and 15a, respectively) of the first internal electrode layers 14 and second internal electrode layers 15 on the inner side are inwardly curved, where close to the height-direction surface f6, at gradually decreasing degrees of bending toward the inner side.

In addition, the lead parts 14a of those several first internal electrode layers 14, among the first internal electrode layers 14, which are close to the width-direction outer surfaces f3a, f4a of the tapered part 11a, respectively, are inwardly curved where close to the respective concaved parts 11b, in a manner corresponding to the shapes of the respective concaved parts 11b, as shown in FIG. 6. Also, the lead parts 15a of those several second internal electrode layers 15, among the second internal electrode layers 15, which are close to the width-direction outer surfaces f3a, f4a of the tapered part 11a, respectively, are inwardly curved, where close to the respective concaved parts 11b, in a manner corresponding to the shapes of the respective concaved parts 11b. More specifically, parts of the lead parts 14a, 15a closest to the width-direction outer surfaces f3a, f4a, respectively, are inwardly curved, where close to the respective concaved parts 11b, in the same manner as with the shapes of the respective concaved parts 11b, while parts of the lead parts 14a, 15a on the inner side, respectively, are inwardly curved, where close to the respective concaved parts 11b, at gradually decreasing degrees of bending toward the inner side.

As shown in FIGS. 1 through 6, the first external electrode 12 is provided at the part of the other height-direction surface f6 of the capacitor body 11 near the one length-direction surface f1 where the width is Wa, in a manner covering the entire surface of this part, while the second external electrode 13 is provided at the part of the other height-direction surface f6 of the capacitor body 11 near the other length-direction surface f2 where the width is Wa, in a manner covering the entire surface of this part. Also, the exposed part of the lead part 14a of each first internal electrode layer 14 is electrically connected to the first external electrode 12, while the exposed part of the lead part 15a of each second internal electrode layer 15 is electrically connected to the second external electrode 13. Although not illustrated, the first external electrode 12 and second external electrode 13 have: a two-layer structure constituted by a base film contacting the part of the other height-direction surface f6 of the capacitor body 11 where the width is Wa, and a surface film contacting the outer side of this base film, or a multi-layer structure constituted by a base film, a surface film, and at least one intermediate film in between them.

As shown in FIGS. 1 through 4, the first external electrode 12 integrally has, on both ends of it in the width direction, engagement parts 12a that wrap around slightly onto the width-direction outer surfaces f3a, f4a of the tapered part 11a of the capacitor body 11 and that also cover, in a belt shape, the parts of the width-direction outer surfaces f3a, f4a adjoining the other height-direction surface f6. Also, the second external electrode 13 integrally has, on both ends of it in the width direction, engagement parts 13a that wrap around slightly onto the width-direction outer surfaces f3a, f4a of the tapered part 11a of the capacitor body 11 and that also cover, in a belt shape, the parts of the width-direction outer surfaces f3a, f4a adjoining the other height-direction surface f6. As a supplemental note, as shown in FIGS. 3 and 6, a part of the first external electrode 12 near each concaved part 11b (including one end of each engagement part 12a in the length direction) wraps around slightly onto each concaved part 11b, while a part of the second external electrode 13 near each concaved part 11b (including one end of each engagement part 13a in the length direction) wraps around slightly onto each concaved part 11b. It should be noted that the symbol D3 in FIG. 4C represents the width-direction dimension of the engagement part 12a or 13a with reference to the edge of the other height-direction surface f6 of the capacitor body 11 where the width is Wa.

This width-direction dimension D3 is smaller than the width-direction dimension D1 shown in FIG. 3. Also, the symbol D4 in FIG. 4C represents the height-direction dimension of the engagement part 12a or 13a with reference to the outer surface of the first external electrode 12 or second external electrode 13 (bottom surface of the first external electrode 12 or second external electrode 13 shown in FIG. 4A or 4B). This height-direction dimension D4 is smaller than the sum of the height-direction dimension Ha shown in FIG. 1 and the thickness T shown in FIGS. 1 and 4C.

The aforementioned parts of the capacitor body 11 except for the first internal electrode layers 14 and second internal electrode layers 15 are preferably made of dielectric ceramics of roughly the same composition and roughly the same dielectric constant, and the dielectric layers between the first internal electrode layers 14 and second internal electrode layers 15 have roughly the same thickness. Here, "dielectric ceramics of roughly the same composition and roughly the same dielectric constant" include dielectric ceramics having the same composition and dielectric constant, as well as dielectric ceramics at least one of whose composition and dielectric constant varies, within an allowable range, due to its relationship with the sintering level, etc., while "roughly the same thickness" includes the same thickness as well as varying thicknesses within an allowable range or manufacturing tolerance due to the relationship with the compression level, etc., when stacked. For these dielectric ceramics, preferably dielectric ceramics whose primary constituent is barium titanate, strontium titanate, calcium titanate, magnesium titanate, calcium zirconate, calcium titanate zirconate, barium zirconate, titanium oxide, etc., or more preferably dielectric ceramics of ε>1000 or Class 2 (high dielectric constant type) can be used.

In addition, the aforementioned base film for the first external electrode 12 and second external electrode 13 is constituted by a baked film, for example, and for this baked film, preferably a good conductor whose primary constituent is nickel, copper, palladium, platinum, silver, gold, or alloy thereof, etc., can be used. The surface film is constituted by a plated film, for example, and for this plated film, preferably a good conductor whose primary constituent is copper, tin, palladium, gold, zinc, or alloy thereof, etc., can be used. The intermediate film is constituted by a plated film, for example, and for this plated film, preferably a good conductor whose primary constituent is platinum, palladium, gold, copper, nickel, or alloy thereof, etc., can be used.

Furthermore, the aforementioned first internal electrode layers 14 and second internal electrode layers 15 are preferably each constituted by a good conductor of roughly the same composition and the first internal electrode layers 14 and second internal electrode layers 15 each have roughly the same thickness. Here, "a good conductor of roughly the same composition" includes a good conductor of the same composition as well as a good conductor whose composition varies, within an allowable range, due to its relationship with the sintering level, etc., while "roughly the same thickness" includes the same thickness as well as varying thicknesses within an allowable range or manufacturing tolerance due to the relationship with the compression level, etc., when stacked. For this good conductor, preferably a good conductor whose primary constituent is nickel, copper, palladium, platinum, silver, gold, or alloy thereof, etc., can be used.

Figure 7A:
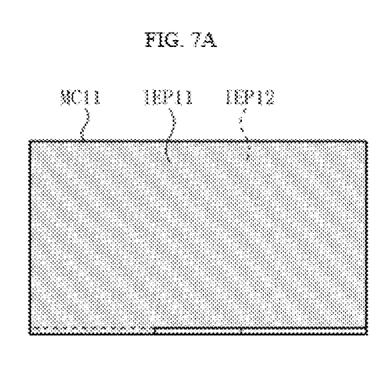
FIGS. 7A and 7B are drawings of cross sections of a laminated chip (FIG. 7A) and an unsintered chip (FIG. 7B) that explain the first manufacturing method example according to an embodiment.
Figure 7B:
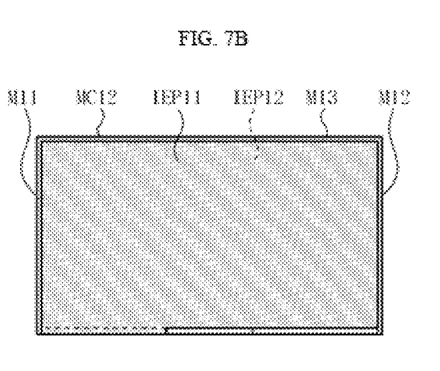
Figure 8:
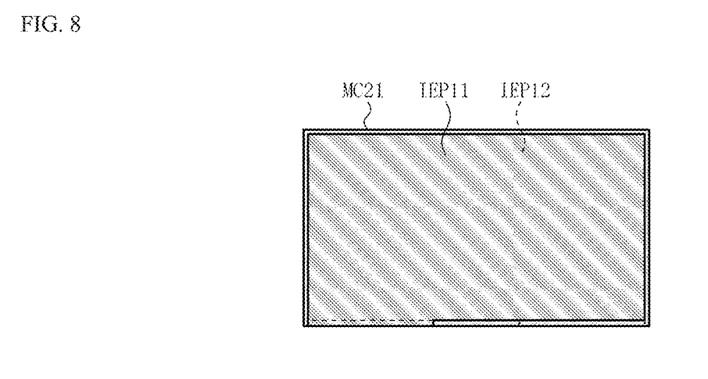
FIG. 8 is a drawing of a cross section of an unsintered chip that explains the second manufacturing method example according to an embodiment.

Next, two manufacturing method examples suitable for the manufacturing of the aforementioned multilayer ceramic capacitor 10, are explained by using FIGS. 7A, 7B, and 8 as deemed appropriate.

First Manufacturing Method Example

For the manufacturing, a ceramic slurry containing dielectric ceramic powder, and an electrode paste containing good conductor powder, are prepared. Next, the ceramic slurry is coated on the surface of a carrier film and then dried to prepare a first green sheet, and also the electrode paste is printed on the surface of this first green sheet and then dried to prepare a second green sheet on which internal electrode patterns have been formed.

Next, unit sheets taken from the first green sheet are stacked and then thermo-compression bonded, and this operation is repeated until a specified number of sheets is reached, to prepare an area corresponding to one margin part in the width direction.

Next, unit sheets (including internal electrode patterns) taken from the second green sheet are stacked and then thermo-compression bonded, and this operation is repeated until a specified number of sheets is reached, to prepare an area corresponding to the capacitive part. Next, unit sheets taken from the first green sheet are stacked and then thermo-compression bonded, and this operation is repeated until a specified number of sheets is reached, to prepare an area corresponding to the other margin part in the width direction. Lastly, all of the stacks are thermo-compression bonded for the last time to prepare an unsintered laminated sheet. In this manufacturing process of an unsintered laminated sheet, a concave that will become the tapered part 11a and concaved part 11b shown in FIGS. 1 through 3 is formed at specified positions on the unsintered laminated sheet by, for example, using an elastic sheet for compression-bonding made of synthetic rubber, etc., whose thickness or shape is changed accordingly.

Next, the unsintered laminated sheet is cut in grids to prepare laminated chips MC11 whose section view is shown in FIG. 7A. The symbol IEP11 in FIG. 7A indicates an internal electrode pattern corresponding to the first internal electrode layer 14 shown in FIGS. 5A and 5B, while the symbol IEP12 indicates an internal electrode pattern corresponding to the second internal electrode layer 15 shown in FIGS. 5A and 5B. It should be noted that the cut laminated chips MC11 do not have the margin parts on both sides in the length direction and the margin part on one side in the height direction. In other words, in this cutting process of the unsintered laminated sheet, the unsintered laminated sheet is cut in such a way that the margin parts on both sides in the length direction and the margin part on one side in the height direction are not formed.

Next, the margin parts M11 to M13 shown in section view in FIG. 7B are formed on both sides in the length direction and one side in the height direction of each laminated chip MC11 whose section view is shown in FIG. 7A, using either the method of attaching the sheets prepared beforehand using the ceramic slurry, or the method of dip-coating and then drying the ceramic slurry, to prepare an unsintered chip MC12.

Next, multiple unsintered chips MC12 whose section view is shown in FIG. 7B are sintered (including binder removal and sintering) together in an ambience and at a temperature profile suitable for the dielectric ceramic powder contained in the ceramic slurry and also for the good conductor powder contained in the electrode paste, to prepare sintered chips each corresponding to the capacitor body 11 shown in FIGS. 1 through 3.

Next, the multiple sintered chips are barrel-polished together to have their corners and ridge lines rounded, to prepare the capacitor body 11 shown in FIGS. 1 through 3.

Next, the other height-direction surface f6 of the capacitor body 11 shown in FIGS. 1 through 3 is dip-coated in an electrode paste (this electrode paste may be the same as the aforementioned electrode paste, or it may be another electrode paste containing a different type of good conductor powder) and the paste is dried, and then baked, to form a base film for the first external electrode 12 and for the second external electrode 13. Next, a surface film covering the base film, or an intermediate film and a surface film, is/are formed by means of plating to prepare the first external electrode 12 and the second external electrode 13 as shown in FIGS. 1 through 3. In the base film formation part of this external electrode preparation process, the viscosity of paste, dipping thickness, dipping area, etc., are adjusted as deemed appropriate so that the parts of the engagement parts 12a, 13a shown in FIGS. 1 through 3, each corresponding to the base film, are formed in such a way that they wrap around slightly onto the width-direction outer surfaces f3a, f4a of the tapered part 11a of the capacitor body 11.

Second Manufacturing Method Example

For the manufacturing, a ceramic slurry containing dielectric ceramic powder, and an electrode paste containing good conductor powder, are prepared. Next, the ceramic slurry is coated on the surface of a carrier film and then dried to prepare a first green sheet, and also the electrode paste is printed on the surface of this first green sheet and then dried to prepare a second green sheet on which internal electrode patterns have been formed.

Next, unit sheets composed of the first green sheet are stacked and then thermo-compression bonded, and this operation is repeated until a specified number of sheets is reached, to prepare an area corresponding to one margin part in the width direction.

Next, unit sheets (including internal electrode patterns) composed of the second green sheet are stacked and then thermo-compression bonded, and this operation is repeated until a specified number of sheets is reached, to prepare an area corresponding to the capacitive part. Next, unit sheets taken from the first green sheet are stacked and then thermo-compression bonded, and this operation is repeated until a specified number of sheets is reached, to prepare an area corresponding to the other margin part in the width direction. Lastly, all of the stacks are thermo-compression bonded for the last time to prepare an unsintered laminated sheet. In this manufacturing process of an unsintered laminated sheet, a concave that will become the tapered part 11a and concaved part 11b shown in FIGS. 1 through 3 is formed at specified positions on the unsintered laminated sheet by, for example, using an elastic sheet for compression-bonding made of synthetic rubber, etc., whose thickness or shape is changed accordingly.

Next, the unsintered laminated sheet is cut in grids to prepare unsintered chips MC21 whose section view is shown in FIG. 8. The symbol IEP11 in FIG. 8 indicates an internal electrode pattern corresponding to the first internal electrode layer 14 shown in FIGS. 5A and 5B, while the symbol IEP12 indicates an internal electrode pattern corresponding to the second internal electrode layer 15 shown in FIGS. 5A and 5B. It should be noted that the cut unsintered chips MC21 have the margin parts on both sides in the length direction and the margin part on one side in the height direction. In other words, in this cutting process of unsintered laminated sheet, the unsintered laminated sheet is cut in such a way that the margin parts on both sides in the length direction and the margin part on one side in the height direction are formed.

Next, multiple unsintered chips MC21 whose section view is shown in FIG. 8 are sintered (including binder removal and sintering) together in an ambience and at a temperature profile suitable for the dielectric ceramic powder contained in the ceramic slurry and also for the good conductor powder contained in the electrode paste, to prepare sintered chips each corresponding to the capacitor body 11 shown in FIGS. 1 through 3.

Next, the multiple sintered chips are barrel-polished together to have their corners and ridge lines rounded, to prepare the capacitor body 11 shown in FIGS. 1 through 3.

Next, the other height-direction surface f6 of the capacitor body 11 shown in FIGS. 1 through 3 is dip-coated in an electrode paste (this electrode paste may be the same as the aforementioned electrode paste, or it may be another electrode paste containing a different type of good conductor powder) and the paste is dried, and then baked, to form a base film for the first external electrode 12 and for the second external electrode 13. Next, a surface film covering the base film, or an intermediate film and a surface film, is/are formed by means of plating to prepare the first external electrode 12 and the second external electrode 13 as shown in FIGS. 1 through 3. In the base film formation part of this external electrode preparation process, the viscosity of paste, dipping thickness, dipping area, etc., are adjusted as deemed appropriate so that the parts of the engagement parts 12a, 13a shown in FIGS. 1 through 3, each corresponding to the base film, are formed in such a way that they wrap around slightly onto the width-direction outer surfaces f3a, f4a of the tapered part 11a of the capacitor body 11.

Next, the effects achieved by the multilayer ceramic capacitor 10 are explained.

(1) With the multilayer ceramic capacitor 10, the fact that its first external electrode 12 and second external electrode 13 are provided on the other height-direction surface f6 of the capacitor body 11, prevents, to the maximum extent possible, the external dimensions of the capacitor body 11 from being limited by the first external electrode 12 and second external electrode 13, compared to when the external electrodes have an L-shape, horizontal U-shape, quadrangular cylinder shape with bottom, or the like. This means that, even when the external dimensions of the multilayer ceramic capacitor 10 are small, the capacitor body 11 can be designed with the maximum possible external dimensions, which in turn allows the contour dimensions of the first internal electrode layer 14 and second internal electrode layer 15 to increase, respectively, thereby increasing the facing area of the internal electrode layers and achieving a larger capacitance as a result.

(2) With the multilayer ceramic capacitor 10, a tapered part 11a whose width gradually decreases toward the other height-direction surface f6 over the entire part in the length direction is provided at a position adjoining the other height-direction surface f6 of the capacitor body 11, and also engagement parts 12a, 13a that wrap around slightly onto the width-direction outer surfaces f3a, f4a of the tapered part 11a, respectively, are provided on both ends of the first external electrode 12 and second external electrode 13 in the width direction. This means that, even when a force is applied to the contact surfaces of the first external electrode 12 and second external electrode 13 after the multilayer ceramic capacitor 10 has been mounted on a circuit board, the respective engagements of the engagement parts 12a, 13a with the width-direction outer surfaces f3a, f4a suppress any displacement of the first external electrode 12 and second external electrode 13 relative to the capacitor body 11, and this in turn mitigates the phenomenon of the first external electrode 12 and second external electrode 13 separating from the capacitor body 11, respectively.

(3) With the laminated capacitor 10, the width-direction dimension D3 of the engagement part 12a or 13a (refer to FIG. 4C) is smaller than one-half the value derived by subtracting the width Wa of the other height-direction surface from the width W of the one height-direction surface f5 of the capacitor body 11. This means that, even when the engagement part 12a is provided on both ends of the first external electrode 12 in the width direction and the engagement part 13a is provided on both ends of the second external electrode 13 in the width direction, the width W that specifies the external dimensions of the capacitor body 11 does not increase, and this in turn prevents in a more reliable manner the external dimensions of the capacitor body 11 from increasing due to the width-direction dimension D3 of the engagement part 12a or 13a, and thereby contributes to the aforementioned capacitance increase.

(4) With the ceramic capacitor 10, the width-direction outer surfaces f3a, f4a of the tapered part 11a are each constituted by a surface that continues steplessly to the one width-direction surface f3 or other width-direction surface f4 of the capacitor body 11. This means that concerns for cracking, chipping, etc., resulting from concentration of stress on any step that may exist between the width-direction outer surface f3a or f4a of the tapered part 11a and the one width-direction surface f3 or other width-direction surface f4 of the capacitor body 11, can be eliminated.

(5) With the multilayer ceramic capacitor 10, the width-direction outer surfaces f3a, f4a of the tapered part 11a are each constituted by an outwardly bulging curved surface. In other words, drop in the strength of the tapered part 11a of the capacitor body 11 can be prevented to the maximum extent possible, compared to when the width-direction outer surfaces f3a, f4a are each constituted by an inwardly concaving curved surface.

(6) With the multilayer ceramic capacitor 10, a concaved part 11b that extends from midway through the width-direction outer surface f3a or f4a in the height direction to the other height-direction surface f6, is provided at the length-direction center of the width-direction outer surface f3a and also at the length-direction center of the width-direction outer surface f4a, of the tapered part 11a. In other words, parts of the first external electrode 12 and second external electrode 13 can be formed in such a way that they wrap around slightly onto the respective concaved parts 11b to achieve engagement, and this in turn suppresses more effectively any displacement of the first external electrode 12 and second external electrode 13 relative to the capacitor body 11, and thereby contributes to the mitigation of the aforementioned separation phenomenon.

(7) With the multilayer ceramic capacitor 10, each concaved part 11b is constituted by a curved surface that steplessly continues to the width-direction outer surface f3a or f4a of the tapered part 11a. This means that concerns for cracking, chipping, etc., resulting from concentration of stress on any step that may exist between each concaved part 11b and the width-direction outer surface f3a or f4a of the tapered part 11a, can be eliminated.

Next, the verified results of the aforementioned effects, especially the verified results of separation strength, are explained.

For the verification, 100 evaluation multilayer ceramic capacitors corresponding to the multilayer ceramic capacitor 10, and 100 comparison multilayer ceramic capacitors not corresponding to the multilayer ceramic capacitor 10, were manufactured.

Specifications of Evaluation Multilayer Ceramic Capacitors

The evaluation multilayer ceramic capacitors were prepared according to the <First Manufacturing Method Example> described above, and their specifications (all values are reference dimensions in design that do not include tolerance) are as follows:

The multilayer ceramic capacitor is 1200 μm long, 700 μm wide and 700 μm high. (The length is indicated by L in FIG. 1, width is indicated by W in FIGS. 2A and 2B, and height is indicated by H in FIG. 1.)

The capacitor body is 1200 μm long, 700 μm wide and 685 μm high. (The capacitor body is indicated by 11 in FIG. 1, and its length is indicated by L in FIG. 1, width is indicated by W in FIGS. 2A and 2B, and height is indicated by H-T in FIG. 1.)

The primary constituent of the capacitor body, except for the first internal electrode layers and second internal electrode layers, is barium titanate. (The first internal electrode layers are indicated by 14 in FIGS. 4A, 4B, and 4C and second internal electrode layers are indicated by 15 in FIGS. 4A, 4B, and 4C.)

The first internal electrode layer and second internal electrode layer, except for the lead parts, have a length-direction dimension of 1170 μm and height-direction dimension of 650 μm, and the respective lead parts have a length-direction dimension of 435 μm and height-direction dimension of 20 μm. (The lead parts are indicated by 14a and 15a in FIGS. 5A and 5B.)

The primary constituent of the first internal electrode layer and second internal electrode layer is nickel, each layer is 0.5 μm thick, and the number of layers is 335 each.

The dielectric layer present between the first internal electrode layer and second internal electrode layer is 0.5 μm thick.

The height-direction dimension of the tapered part of the capacitor body is 120 μm, and the radius of curvature of the width-direction outer surface of the tapered part is 120 μm. (The tapered part is indicated by 11a in FIG. 1, height-direction dimension is indicated by Ha in FIG. 1, and width-direction outer surface is indicated by f3a or f4a in FIGS. 2A and 2B.)

The other height-direction surface of the capacitor body is 600 μm wide on the wider side and 500 μm wide on the narrower side. (The other height-direction surface is indicated by f6 in FIG. 3, its width on the wider side is indicated by Wa in FIG. 3 and width on the narrower side is indicated by Wb in FIG. 3, and D1 in FIG. 3 is 50 μm, and D2 in FIG. 3 is 100 μm.)

The margin parts on both sides of the capacitor body in the length direction are 15 μm thick, margin parts on both sides in the width direction are 15 μm thick, margin part on one side in the height direction is 15 μm thick, and margin part on the other side in the height direction is 20 μm thick. (The one side in the height direction corresponds to the top side in FIGS. 5A and 5B, and the other side in the height direction corresponds to the bottom side in FIGS. 5A and 5B.)

The first external electrode and second external electrode have a length-direction dimension of 470 μm and width-direction dimension of 640 μm. (The first external electrode is indicated by 12 in FIG. 1 and second external electrode is indicated by 13 in FIG. 1.).

The first external electrode and second external electrode have a space of 260 μm between them in the length direction.

The first external electrode and second external electrode have a three-layer structure and are each 15 μm thick, where the base film is primarily constituted by copper and 10 μm thick, the intermediate film is primarily constituted by nickel and 2 μm thick, and the surface film is primarily constituted by tin and 3 μm thick. (The thickness of the first external electrode and that of the second external electrode are each indicated by T in FIGS. 1 and 4C.)

The engagement parts of the first external electrode and second external electrode have a width-direction dimension of 20 μμm and height-direction dimension of 20 μm. (The engagement parts are indicated by 12a in FIGS. 4A and 4C, and 13a in FIG. 4B, width-direction dimension is indicated by D3 in FIG. 4C, and height-direction dimension is indicated by D4 in FIG. 4C.)

Specifications of Comparison Multilayer Ceramic Capacitors

The comparison multilayer ceramic capacitors were prepared according to <First Manufacturing Method Example> described above, in the same manner as the evaluation multilayer ceramic capacitors, and because they differed from the evaluation multilayer ceramic capacitors only in that their first external electrode and second external electrode did not have the engagement parts (12a in FIGS. 4A and 4C, and 13a in FIG. 4B), only the specification of the first external electrode and second external electrode is described below.

The first external electrode and second external electrode have a length-direction dimension of 470 μm and width-direction dimension of 600 μm.

The first external electrode and second external electrode have a space of 260 μm between them in the length direction.

The first external electrode and second external electrode have a three-layer structure and are each 15 μm thick, where the base film is primarily constituted by copper and 10 μm thick, the intermediate film is primarily constituted by nickel and 2 μm thick, and surface film is primarily constituted by tin and 3 μm thick.

For the verification of effects, the 100 evaluation multilayer ceramic capacitors and 100 comparison multilayer ceramic capacitors were tested by pressing a piece of adhesive tape (CT-24 manufactured by Nichiban) with an adhesive strength of 10 N per 25 mm, onto the first external electrode and second external electrode of each multilayer ceramic capacitor and then peeling it off. As a result of the test, none of the 100 evaluation multilayer ceramic capacitors had both their first external electrode and second external electrode separated, while three of the 100 comparison multilayer ceramic capacitors had both their first external electrode and second external electrode separated. This confirmed that the evaluation multilayer ceramic capacitors had better separation strength with respect to the first external electrode and second external electrode compared to the comparison multilayer ceramic capacitors.

The following is a supplemental note on the width-direction dimension D3 (refer to FIG. 4C) and height-direction dimension D4 (refer to FIG. 4C) of the aforementioned engagement parts 12a, 13a of the first external electrode 12 and second external electrode 13, respectively, by considering the specifications of the evaluation multilayer ceramic capacitors, etc.

While the engagement parts 12a, 13a of the evaluation multilayer ceramic capacitors illustrated each had a width-direction dimension D3 of 20 μm and height-direction dimension D4 of 20 μm, it is possible, based on calculations, to increase the width-direction dimension D3 to one-half the value derived by subtracting the width Wa of the other height-direction surface f6 from the width W of the capacitor body 11 ((W−Wa)/2) as shown in FIG. 3, or specifically to the width-direction dimension D1 in FIG. 3, while it is possible, based on calculations, to increase the height-direction dimension D4 to the height-direction dimension Ha of the tapered part 11a as shown in FIG. 1. However, there are concerns that, when the value of width-direction dimension D3 is designed the same as the value of width-direction dimension D1 and the value of height-direction dimension D4 is designed the same as the value of height-direction dimension Ha, then the positive-side manufacturing tolerance, shape change when the base film is formed, etc., may cause the engagement parts 12a, 13a to respectively project outward from the one width-direction surface f3 and other width-direction surface f4 of the capacitor body 11 shown in FIGS. 2A and 2B. The lower-limit value of the width-direction dimension D3 and that of the height-direction dimension D4 are around 10 μm in order to achieve engagement with the width-direction outer surfaces f3a, f4a of the tapered part 11a; however, desirably the upper-limit value of the width-direction dimension D3 and that of the height-direction dimension D4 are determined through prototyping. It should be noted that, based on the specification of the prototype manufactured when the evaluation multilayer ceramic capacitors were manufactured, the aforementioned concerns can be reliably eliminated by setting the upper-limit value of the width-direction dimension D3 to around two-thirds of the width-direction dimension D1 and also by setting the upper-limit value of the height-direction dimension D4 to around two-thirds of the height-direction dimension Ha.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2015-238557, filed Dec. 7, 2015, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. A multilayer ceramic capacitor constituted by a capacitor body of roughly rectangular solid shape constituted by two height-direction surfaces, two width-direction surfaces, and two length-direction surfaces, which capacitor body has a first external electrode and a second external electrode both provided on one of the two height-direction surfaces of the capacitor body, with a space between the first and second electrodes in a length direction, wherein:
the capacitor body has a built-in capacitive part comprising multiple first internal electrode layers and multiple second internal electrode layers stacked alternately in a width direction with dielectric layers in between;
a lead part of each of the multiple first internal electrode layers is exposed on the one of the two height-direction surfaces, with said exposed part connected independently and electrically to the first external electrode;
a lead part of each of the multiple second internal electrode layers is exposed on the one of the two height-direction surfaces, with said exposed part connected independently and electrically to the second external electrode;
each of the width-direction surfaces of the capacitor body has, at a position adjoining the one of the two height-direction surfaces, a tapered part whose width gradually decreases toward the one of the two height-direction surfaces over a whole part in the length direction; and
the first external electrode and second external electrode have engagement parts at their two ends in the width direction, each engagement part extending and wrapping around onto a width-direction outer surface of the tapered part.

2. A multilayer ceramic capacitor according to claim 1, wherein the width- direction dimension of each of the engagement parts is smaller than one-half a value derived by subtracting a width of one of the two height-direction surfaces from a width of the other of the two height-direction surfaces, of the capacitor body.

3. A multilayer ceramic capacitor according to claim 2, wherein the width-direction outer surfaces of the tapered parts are each constituted by a surface that steplessly continues to each of the two width-direction surfaces of the capacitor body.

4. A multilayer ceramic capacitor according to claim 3, wherein the width-direction outer surfaces of the tapered part are each constituted by an outwardly bulging curved surface.

5. A multilayer ceramic capacitor according to claim 4, wherein the width-direction outer surfaces of the tapered parts each have, at a center of each tapered part in the length direction, a concaved part that extends from an approximately midpoint of the tapered part in the height direction through the width-direction outer surface to the one of the two height-direction surfaces.

6. A multilayer ceramic capacitor according to claim 5, wherein the concaved parts are each constituted by a curved surface that steplessly continues to each of the width-direction outer surfaces.

7. A multilayer ceramic capacitor according to claim 3, wherein the width-direction outer surfaces of the tapered parts each have, at a center of each tapered part in the length direction, a concaved part that extends from an approximately midpoint of the tapered part in the height direction through the width-direction outer surface to the one of the two height-direction surfaces.outer surfaces.

8. A multilayer ceramic capacitor according to claim 7, wherein the concaved parts are each constituted by a curved surface that steplessly continues to each of the width-direction outer surfaces.

9. A multilayer ceramic capacitor according to claim 2, wherein the width-direction outer surfaces of the tapered parts each have, at a center of each tapered part in the length direction, a concaved part that extends from an approximately midpoint of the tapered part in the height direction through the width-direction outer surface to the one of the two height-direction surfaces.

10. A multilayer ceramic capacitor according to claim 9, wherein the concaved parts are each constituted by a curved surface that steplessly continues to each of the width-direction outer surfaces.

11. A multilayer ceramic capacitor according to claim 1, wherein the width-direction outer surfaces of the tapered parts are each constituted by a surface that steplessly continues to each of the two width-direction surfaces of the capacitor body.

12. A multilayer ceramic capacitor according to claim 11, wherein the width-direction outer surfaces of the tapered part are each constituted by an outwardly bulging curved surface.

13. A multilayer ceramic capacitor according to claim 12, wherein the width-direction outer surfaces of the tapered parts each have, at a center of each tapered part in the length direction, a concaved part that extends from an approximately midpoint of the tapered part in the height direction through the width-direction outer surface to the one of the two height-direction surfaces.

14. A multilayer ceramic capacitor according to claim 13, wherein the concaved parts are each constituted by a curved surface that steplessly continues to each of the width-direction outer surfaces.

15. A multilayer ceramic capacitor according to claim 11, wherein the width-direction outer surfaces of the tapered parts each have, at a center of each tapered part in the length direction, a concaved part that extends from an approximately midpoint of the tapered part in the height direction through the width-direction outer surface to the one of the two height-direction surfaces.

16. A multilayer ceramic capacitor according to claim 15, wherein the concaved parts are each constituted by a curved surface that steplessly continues to each of the width-direction outer surfaces.

17. A multilayer ceramic capacitor according to claim 1, wherein the width-direction outer surfaces of the tapered parts each have, at a center of each tapered part in the length direction, a concaved part that extends from an approximately midpoint of the tapered part in the height direction through the width-direction outer surface to the one of the two height-direction surfaces.

18. A multilayer ceramic capacitor according to claim 17, wherein the concaved parts are each constituted by a curved surface that steplessly continues to each of the width-direction outer surfaces.

* * * * *